United States Patent
Dietz et al.

(10) Patent No.: US 11,623,339 B1
(45) Date of Patent: Apr. 11, 2023

(54) PORTABLE ROBOTIC MANIPULATION SYSTEMS

(71) Applicant: Amazon Technologies, Inc., Seattle, WA (US)

(72) Inventors: Timothy G. Dietz, Middlesex, MA (US); Beth A. Marcus, Bedford, MA (US); Felipe De Arruda Camargo Polido, North Reading, MA (US); Michel Bruehwiler, Cambridge, MA (US); Kristine Moore, Cambridge, MA (US); Kyle Rawding, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 720 days.

(21) Appl. No.: 16/559,105

(22) Filed: Sep. 3, 2019

Related U.S. Application Data

(60) Provisional application No. 62/848,795, filed on May 16, 2019.

(51) Int. Cl.
  *B25J 9/16* (2006.01)
  *B25J 9/00* (2006.01)

(52) U.S. Cl.
  CPC .......... *B25J 9/0009* (2013.01); *B25J 9/0084* (2013.01); *B25J 9/1697* (2013.01)

(58) Field of Classification Search
  USPC ................................................. 700/245–264
  See application file for complete search history.

(56) References Cited

U.S. PATENT DOCUMENTS

| | | | | |
|---|---|---|---|---|
| 4,736,826 A | * | 4/1988 | White | G05D 1/0272 191/12.2 A |
| 6,194,860 B1 | * | 2/2001 | Seelinger | B25J 5/007 318/587 |
| 7,066,291 B2 | * | 6/2006 | Martins | B25J 9/08 180/169 |
| 7,174,238 B1 | * | 2/2007 | Zweig | H04L 67/025 700/94 |
| 9,020,636 B2 | * | 4/2015 | Tadayon | F24S 40/20 901/1 |
| 9,457,477 B1 | * | 10/2016 | Rublee | B25J 15/0023 |
| 9,486,921 B1 | * | 11/2016 | Straszheim | B25J 9/1697 |
| 9,519,882 B2 | * | 12/2016 | Galluzzo | G05D 1/0088 |
| 9,802,317 B1 | * | 10/2017 | Watts | G05B 19/402 |
| 9,827,678 B1 | * | 11/2017 | Gilbertson | A47L 11/4055 |
| 10,108,194 B1 | * | 10/2018 | Russell | G05D 1/0212 |
| 10,399,778 B1 | * | 9/2019 | Shekhawat | G06Q 50/28 |
| 10,757,861 B2 | * | 9/2020 | Robertson | B25J 11/00 |

(Continued)

*Primary Examiner* — Jonathan L Sample
(74) *Attorney, Agent, or Firm* — Eversheds Sutherland (US) LLP

(57) ABSTRACT

Systems, methods, and computer-readable media are disclosed for portable robotic manipulation systems. In one embodiment, an example robot assembly may include a first portion that includes a first robotic arm configured to manipulate objects, a second portion coupled to the first portion, the second portion including a moveable sensor assembly, and a controller configured to control operation of the first robotic arm and operation of the moveable sensor assembly. The robot assembly is portable and configured to operate in fenced or unfenced environments, and may be configured to perform different tasks in different environments.

11 Claims, 10 Drawing Sheets

(56) References Cited

U.S. PATENT DOCUMENTS

| | | | |
|---|---|---|---|
| 11,046,562 B2* | 6/2021 | High | G06Q 50/28 |
| 2004/0015266 A1* | 1/2004 | Skoog | B25J 5/007 |
| | | | 700/245 |
| 2005/0107920 A1* | 5/2005 | Ban | B25J 9/1692 |
| | | | 700/245 |
| 2005/0126144 A1* | 6/2005 | Koselka | A01D 46/30 |
| | | | 56/10.2 R |
| 2006/0213167 A1* | 9/2006 | Koselka | A01B 51/026 |
| | | | 56/10.2 A |
| 2007/0061041 A1* | 3/2007 | Zweig | G05D 1/0261 |
| | | | 700/245 |
| 2011/0046781 A1* | 2/2011 | Summer | B25J 9/162 |
| | | | 700/248 |
| 2013/0226340 A1* | 8/2013 | Buchstab | B25J 5/04 |
| | | | 700/245 |
| 2014/0350725 A1* | 11/2014 | LaFary | B25J 9/1676 |
| | | | 901/50 |
| 2016/0129592 A1* | 5/2016 | Saboo | G05D 1/0297 |
| | | | 700/248 |
| 2017/0113352 A1* | 4/2017 | Lutz | G05D 1/0291 |
| 2018/0001476 A1* | 1/2018 | Tan | B61G 7/04 |
| 2018/0018415 A1* | 1/2018 | Pulfer | G06F 30/33 |
| 2018/0021954 A1* | 1/2018 | Fischer | B25J 13/089 |
| | | | 700/253 |
| 2018/0104829 A1* | 4/2018 | Altman | H01M 10/46 |
| 2018/0113468 A1* | 4/2018 | Russell | G05D 1/0251 |
| 2018/0147106 A1* | 5/2018 | Soundararajan | A61B 34/70 |
| 2018/0196404 A1* | 7/2018 | Stilwell | B25J 9/162 |
| 2018/0326507 A1* | 11/2018 | Halvorsen | B25H 1/0035 |
| 2018/0361586 A1* | 12/2018 | Tan | B61G 7/04 |
| 2019/0138009 A1* | 5/2019 | Saito | B25J 5/007 |
| 2020/0061840 A1* | 2/2020 | Yin | B25J 18/02 |
| 2020/0100639 A1* | 4/2020 | Ullmann | G05B 19/19 |

* cited by examiner

PORTABLE ROBOTIC MANIPULATION SYSTEMS

CROSS-REFERENCE TO RELATED APPLICATION

This application claims the benefit of U.S. Provisional Application No. 62/848,795, filed May 16, 2019, which is incorporated by reference in its entirety.

BACKGROUND

Warehouses, fulfillment centers, and other such locations may be used for item storage, packaging of items, shipping or distribution of items, and other tasks. Inside such locations, machines may be used in combination with human effort to perform certain tasks. For example, forklifts may be used to move pallets of materials from one location to another. For some tasks, robotic arms may be used. Robotic arms may be needed in various locations. However, certain robotic arms may be in fixed locations or otherwise difficult to move. For example, due to power constraints, robotic arms may not be moveable and may therefore be designated to perform a specific task. Mobile robots and/or robotic arms may be desired.

Figure 1:
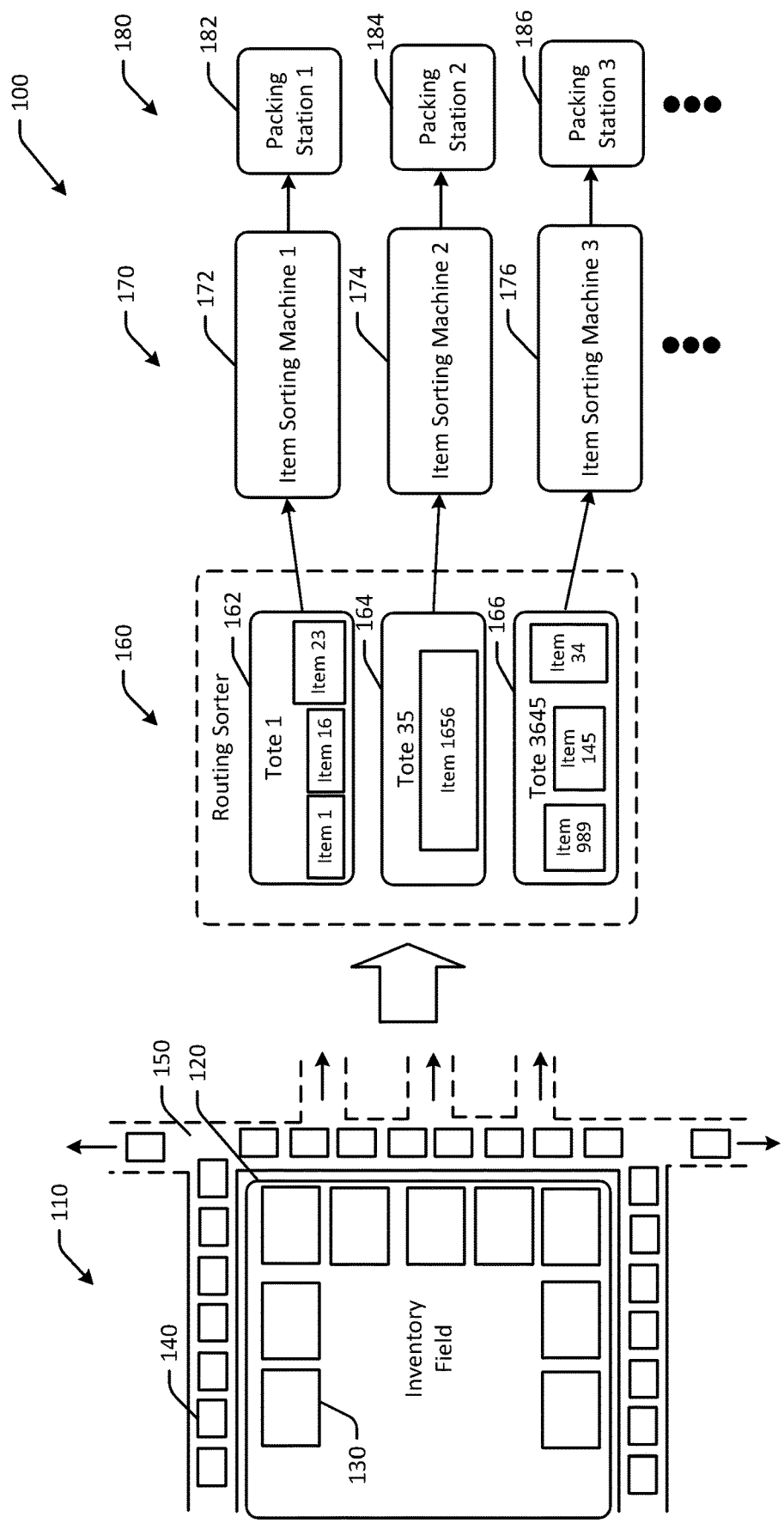
FIG. 1 is a hybrid schematic illustration of an example use case for portable robotic manipulation systems and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products throughout a fulfillment or distribution center (or other space) may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, may be difficult depending on a type of packaging in which the item comes with. Further, once all of the items in an order are aggregated (for either single item or multi-item orders), the items may be placed into boxes for shipping. The boxes may then be loaded onto trucks or other forms of transport.

Accordingly, at various stages and/or locations within a fulfillment center, different tasks may need to be performed, each requiring different skills. Humans may be able to perform each of the different tasks, whereas robots may need specific equipment or may not be able to move within a fulfillment center so as to reach the different locations at which the different tasks are to be performed. However, robots may be able to assist humans in performing certain tasks, or may automate certain tasks, thereby increasing human effort efficiency and/or allowing human effort to be focused on higher cognition tasks. In order to assist humans and/or autonomously perform tasks, robots need to be in the correct location. Some robots may have limited movement ability and/or may be permanently fixed at a location due to power requirements (e.g., specific power needs or connection types, etc.), due to size or footprint (e.g., the robot is too large or heavy to move, etc.), due to stability (e.g., the robot is bolted to the floor for stability, etc.), and so forth. As a result, using the same robot to perform different tasks at different locations may be desired.

Embodiments of the disclosure include methods and systems for automated performance of different programmable or selectable tasks at different locations of a fulfilment center or other location using portable robotic manipulation systems. Certain embodiments include assemblies with one or more robotic arms that include picking assemblies to pick up and/or release, or otherwise handle, objects, so as to increase throughput and speed of object handling. Some embodiments include cameras that can be used to guide robotic arms to perform certain tasks. Certain embodiments include robotic assemblies that can easily be transported from one location to another, for example using a forklift, and operate on a wall power supply. In some instances, more than one cart or portion can be included in the same robotic assembly to prevent vibration transfer. Some embodiments include optimized process flows for processing of orders at fulfillment centers, as well as process flows or methods to increase speed of consolidating products in a multi-item order as a result of improved speed in placing items into containers and removing items from containers. As a result, throughput of fulfillment centers may be improved, and/or logistics of fulfillment center operations may be less complicated.

Some embodiments may be configured to rapidly deploy one or more robotic arms to perform multiple types of automation tasks in a warehouse fulfilment environment, such as item picking, item sortation, packaging, and so forth. Unlike other robotic arm deployments, embodiments of the disclosure may not be semi-permanent installations (e.g., may not be bolted to the floor, etc.) with dedicated fencing. Instead, embodiments of the disclosure are mobile and can be moved anywhere within a warehouse to perform tasks. When parked or secured, embodiments of the disclosure are stabilized by leveling feet and the assemblies own inertia, and are not attached to the floor or other structure. Associate functional safety is ensured by using a collaborative robotic platform and is further enabled by optical sensors that establish a safe operating zone.

Referring to FIG. 1, an example use case 100 for portable robotic manipulation systems and an example process flow in accordance with one or more embodiments of the disclosure. Although discussed in the context of online orders and fulfillment centers, other embodiments may be directed to any suitable use case where objects are picked and released, such as instances where objects are picked from inventory, placed into containers, removed from containers for sorting, and so forth in any suitable environment.

In FIG. 1, a fulfillment center may include an inventory field 110, a routing sorter 160, one or more item sorting machines 170, and one or more packing stations 180. The inventory field 110 may be include a storage platform, or a portion of the fulfillment center at which products picked from product inventory are placed. Robots, such as portable robotic manipulation systems, may be used to pick products from inventory and to deliver to the robotic storage platform in some instances, while in other instances, manual labor or a combination thereof may be used to pick products. For example, portable robotic manipulation systems may be used to pick objects from inventory containers and to place the retrieved objects into containers. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include portable robotic manipulation systems, or a combination thereof. In some instances, picking of items from the inventory field 110 may be completed by robots that include portable robotic manipulation systems, where the items are delivered to the picking stations 130 after being retrieved from the inventory field 110. Any number of picking stations 130 may be included, and the picking stations 130 may be located in a different position than that illustrated in FIG. 1.

One or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more totes 140. For example, as totes 140 move along the conveyors 150, items may be moved from the picking stations 130 into respective totes 140. The totes 140 may be associated with particular item sorting machines, and may be moved using the conveyors 150 to a routing sorter 160.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Items may be inducted to item sorting machines from totes by one or more portable robotic manipulation systems. For example, portable robotic manipulation systems may retrieve individual items from totes and place the items on conveyors or other devices such that the items are input to the item sorting machine for sortation.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time. Packing of items may include placement of items into boxes by, for example, portable robotic manipulation systems. The portable robotic manipulation systems may retrieve sorted items from the item sorting machines and place the item into a box.

At any of the stages of the example fulfillment process of FIG. 1 where handling of objects is used, such as to pick items from inventory, place items in totes, remove items from totes, place items into bins, remove items from bins, place items into boxes for shipping, and so forth, portable robotic manipulation systems as described herein may be used. As a result, manual effort can be redirected to other tasks. Moreover, in some instances, portable robotic manipulation systems may be moved from one task and/or section of the fulfillment center to another to perform different tasks as needed to assist with volume, workload, bottlenecks, and the like.

Embodiments of the disclosure include portable robotic manipulation systems. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

As a result of portable robotic manipulation systems, customers may benefit from speedier package delivery even during peak order periods. Portable robotic manipulation systems may be rapidly deployed (e.g., in under 10 minutes) in compact locations, and can safely operate next to humans without fencing. Embodiments include a safety certified robot arm, and may include one or more of an end-of-arm tool (e.g., picker, etc.), a suite of sensors, and/or a collection of smart fulfillment applications. Portable robotic manipulation systems may perform different tasks, which may be determined based at least in part on location, user input, automated scanning (e.g., of a machine readable code such as a QR code, barcode, fiducial, etc.), or another input. For example, portable robotic manipulation systems may pick a customer order from a tote and place it in the shipping box for taping by a human. Some embodiments may operate unattended. Embodiments may be configured to induct over 1 million items or more per day in a fulfillment center. Some portable robotic manipulation systems include intuitive interfaces, and can perform collaborative assistive tasks that enhance human throughput while reducing ergonomic stressors. Portable robotic manipulation systems automate ergonomically stressful tasks, while allowing humans to perform high-cognition tasks. Portable robotic manipulation systems may be fully commissioned, calibrated, and tested off-site, so as to bring onsite setup time down dramatically.

Portable robotic manipulation systems may operate in different operational modes, such as assistive mode and autonomous mode. In assistive mode, portable robotic manipulation systems operate to assist humans to accomplish tasks in an effective and ergonomically friendly manner. An example is an assistive truck fluid load where humans accomplish their loading without going up and down a ladder. In autonomous mode, portable robotic manipulation systems operate to complete tasks on its own without manual intervention. An example is an autonomous tote unpack, and tote consolidation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

ILLUSTRATIVE EMBODIMENTS AND USE CASES

Figure 2:
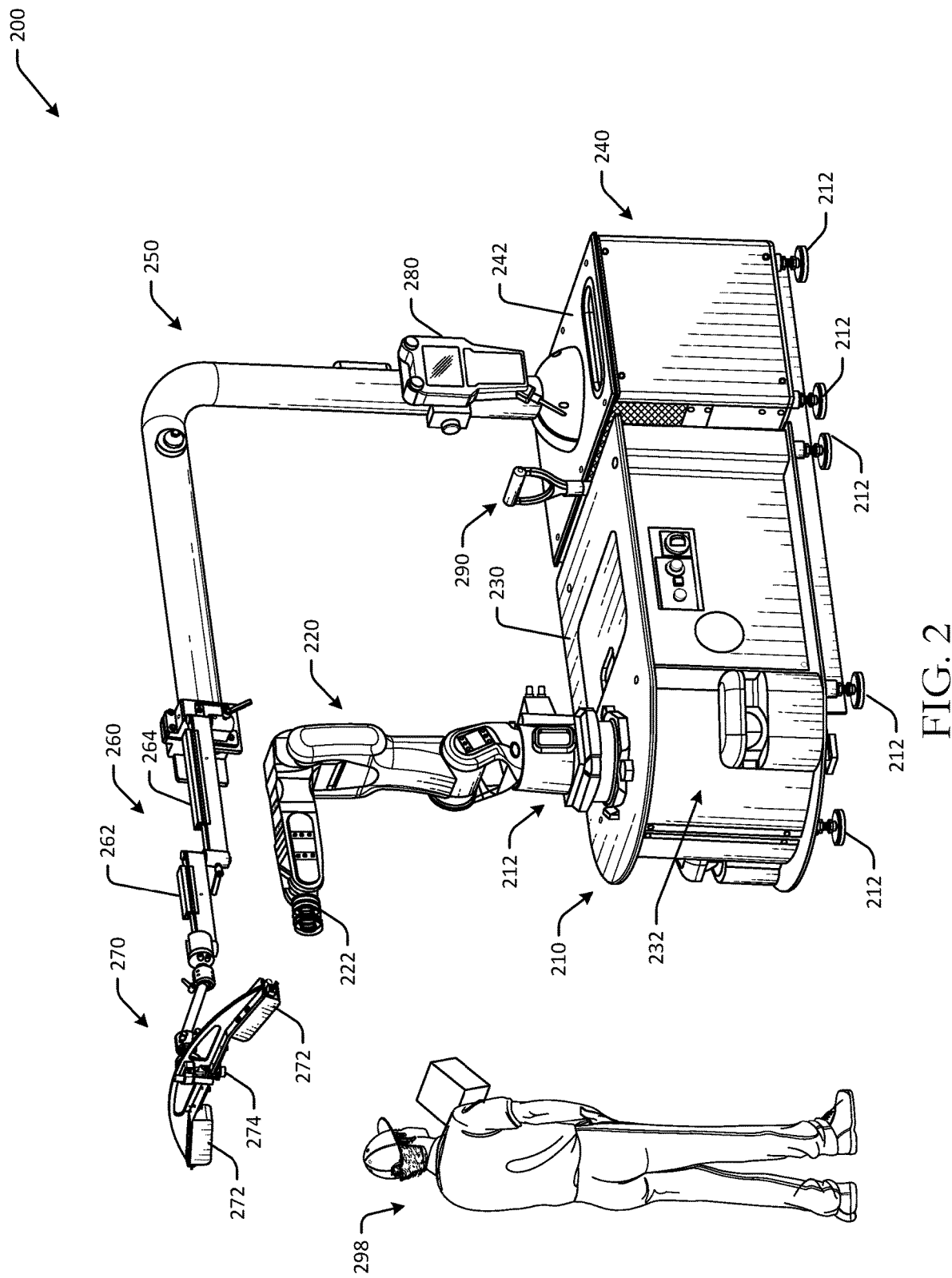
FIG. 2 is a schematic illustration of an example portable robotic manipulation assembly in accordance with one or more embodiments of the disclosure.

FIG. 2 is a schematic illustration of an example portable robotic assembly 200 in accordance with one or more embodiments of the disclosure. Other embodiments may include additional or fewer components. The illustration of FIG. 2 may not be to scale, and may not be illustrated to scale with respect to other figures. The portable robotic manipulation assembly illustrated in FIG. 2 may be the portable robotic manipulation assembly discussed with respect to FIG. 1.

The portable robotic assembly 200 may include a first portion, which may be a first cart 210, and a second portion, which may be a second cart 240. In other embodiments, the first portion and second portion may be part of the same structure and may not be carts. The first cart 210 may be coupled to the second cart 240. The first cart 210 may be decoupled from the second cart 240 using a removable pin 290, as discussed with respect to FIG. 8. The first cart 210 may include one or more sidewalls, a first upper surface 230, and a first lower surface. The first upper surface 230 may include a set of apertures for airflow. The first upper surface 230 may be a floating surface or may otherwise be supported at least partially by compressed air, so as to reduce vibration transfer. For example, the portable robotic assembly 200 may include a set of one or more pneumatic supports 232 that may be coupled to the first upper surface 230 and configured to dampen vibration. The pneumatic supports 232 may be configured to direct airflow to a lower portion of the first upper surface 230, where the air exits the portable robotic assembly 200 through the apertures in the first upper surface 230. The airflow may provide a cushion for the first upper surface 230 and may isolate vibration from impacting performance of components disposed on the first upper surface 230. The first upper surface 232 may be self-leveling. The portable robotic assembly 200 may not be coupled to a floor or a permanent support. The portable robotic assembly 200 may be configured to operate using 120 volt power, 220 volt power, or another standard wall outlet grid power.

The second cart 240 may be coupled to the first cart 210, and may include one or more sidewalls, a second upper surface 242, and a second lower surface. The second upper surface 242 may be rigidly coupled to the sidewalls of the second cart 240, or may be a floating surface as well. The first upper surface 232 and the second upper surface 242 may be level, or may be disposed at the same height. The second upper surface 242 may be self-leveling. The first upper surface 232 may therefore be configured to move relative to sidewalls of the first cart 210, and the second upper surface 242 of the second cart 240 may be fixed relative to sidewalls of the second cart 240.

The portable robotic assembly 200 may include a set of supports 212 disposed along the respective first lower surface and second lower surface. The set of supports 212 may dampen vibration transfer and may create clearance between the floor and the portable robotic assembly 200, such that forklifts or pallet trucks can be inserted underneath the portable robotic assembly 200. For example, the portable robotic assembly 200 may include a first pallet truck guiding rail coupled to both the first lower surface and the second lower surface, and a second pallet truck guiding rail coupled to both the first lower surface and the second lower surface, where the second pallet truck guiding rail is disposed adjacent to the first pallet truck guiding rail, and where the first and second pallet truck guiding rails are configured to allow a fork of pallet trucks to slide along the respective first and second pallet truck guiding rails from either side. At least one of the first cart 210 or the second cart 240 may be slideable along the first pallet truck guiding rail and the second pallet truck guiding rail, to push the carts closer together and/or pull the carts apart.

A first robotic arm 220 may be disposed on the first upper surface 232. The first robotic arm 220 may include any number of different interchangeable tool attachments 222, such as a picking assembly configured to grasp objects, a camera, other sensors, other suction and/or mechanical tools, or another tool attachment. The first robotic arm 220 may include, or may be coupled to, a torque resistance sensor 212 to improve safety and/or performance of the first robotic arm 220.

A second robotic arm 250, or in some instances a bent arm or boom assembly, may be disposed on the second upper surface 242. The second robotic arm 250 may include a camera assembly 270 configured to image objects grasped by the first robotic arm 220. For example, the camera assembly 270 may include a set of stereo cameras 272 and a scanning camera 274. The camera assembly 270 may be coupled to a boom assembly 260 that includes a first member 262 and a second member 264 to provide increased ranges of motion. The camera and boom assembly is described in more detail with respect to FIG. 6. The second cart 240 may include one or more overhead cameras and/or sensors.

The portable robotic assembly 200 may include a display 280 configured to present one or more selectable options, where selection of an option causes a computer system or a controller to initiate a corresponding action or operational mode at the portable robotic assembly 200. The display 280 may include an emergency stop button.

No fixed or removable fencing is required for safety allowing humans to work in close proximity or even collaboratively with the portable robotic assembly 200. Safety is achieved through the robotic arm collaborative safety system, optionally in conjunction with a LIDAR sensor on either side to establish a safety perimeter. When operating in the collaborative mode, such as that illustrated in FIG. 2 with human 298 in the presence of the portable robotic manipulation assembly 300, the robot arm 220 will instantly respond to the physical touch of a human, either intentional or inadvertent. If the system is in a work environment where close collaboration is not part of the task, the arm can be operated in a faster acceleration mode and the LIDAR sensors used as electronic safety fencing.

Figure 3A:
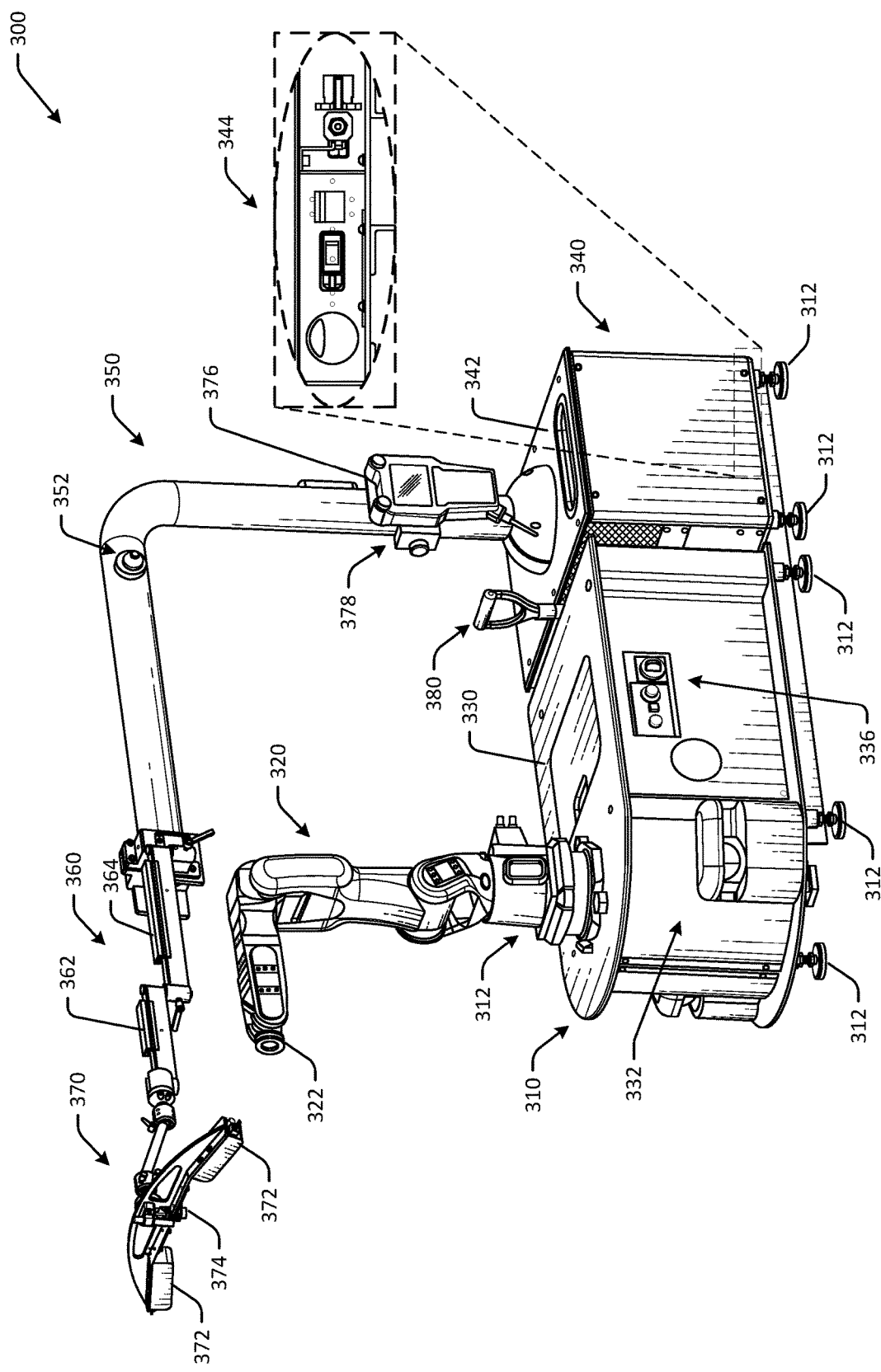
FIG. 3A is a schematic illustration of an example portable robotic manipulation assembly in perspective view in accordance with one or more embodiments of the disclosure.

FIG. 3A is a schematic illustration of an example portable robotic manipulation assembly 300 in perspective view in accordance with one or more embodiments of the disclosure. Other embodiments may include additional or fewer components. The illustration of FIG. 3A is not to scale, and may not be illustrated to scale with respect to other figures. The portable robotic manipulation assembly illustrated in FIG. 3A may be the same portable robotic manipulation assembly discussed with respect to FIGS. 1-2.

The portable robotic assembly 300 may include a first portion, which may be a first cart 310, and a second portion, which may be a second cart 340. In other embodiments, the first portion and second portion may be part of the same structure and may not be carts. The first cart 310 may be coupled to the second cart 340. The first cart 310 may be decoupled from the second cart 340 using a removable pin 380, as discussed with respect to FIG. 8. The first cart 310 may include one or more sidewalls, a first upper surface 330, and a first lower surface. The first upper surface 330 may include a set of apertures for airflow. The first upper surface 330 may be a floating surface or may otherwise be supported at least partially by compressed air, so as to reduce vibration transfer. For example, the portable robotic assembly 300 may include a set of one or more pneumatic supports 332 that may be coupled to the first upper surface 330 and configured to dampen vibration. The pneumatic supports 332 may be configured to direct airflow to a lower portion of the first upper surface 330, where the air exits the portable robotic assembly 300 through the apertures in the first upper surface 330. The airflow may provide a cushion for the first upper surface 330 and may isolate vibration from impacting performance of components disposed on the first upper surface 330. The first upper surface 332 may be self-leveling. The portable robotic assembly 300 may not be coupled to a floor or a permanent support. The portable robotic assembly 300 may be configured to operate using 120 volt power, 320 volt power, or another standard wall outlet grid power.

The second cart 340 may be coupled to the first cart 310, and may include one or more sidewalls, a second upper surface 342, and a second lower surface. The second upper surface 342 may be rigidly coupled to the sidewalls of the second cart 340, or may be a floating surface as well. The first upper surface 332 and the second upper surface 342 may be level, or may be disposed at the same height. The second upper surface 342 may be self-leveling. The first upper surface 332 may therefore be configured to move relative to sidewalls of the first cart 310, and the second upper surface 342 of the second cart 340 may be fixed relative to sidewalls of the second cart 340.

The portable robotic assembly 300 may include a set of supports 312 disposed along the respective first lower surface and second lower surface. The set of supports 312 may dampen vibration transfer and may create clearance between the floor and the portable robotic assembly 300, such that forklifts or pallet trucks can be inserted underneath the portable robotic assembly 300. For example, the portable robotic assembly 300 may include a first pallet truck guiding rail coupled to both the first lower surface and the second lower surface, and a second pallet truck guiding rail coupled to both the first lower surface and the second lower surface, where the second pallet truck guiding rail is disposed adjacent to the first pallet truck guiding rail, and where the first and second pallet truck guiding rails are configured to allow a fork of pallet trucks to slide along the respective first and second pallet truck guiding rails from either side. At least one of the first cart 310 or the second cart 340 may be slideable along the first pallet truck guiding rail and the second pallet truck guiding rail, to push the carts closer together and/or pull the carts apart.

A first robotic arm 320 may be disposed on the first upper surface 332. The first robotic arm 320 may include any number of different interchangeable tool attachments 322, such as a picking assembly configured to grasp objects, a camera, or another tool attachment. The first robotic arm 320 may include, or may be coupled to, a torque resistance sensor 312 to improve safety and/or performance of the first robotic arm 320.

A second robotic arm 350, or in some instances a bent arm or boom assembly, may be disposed on the second upper surface 342. The second robotic arm 350 may include a camera assembly 370 configured to image objects grasped by the first robotic arm 320. For example, the camera assembly 370 may include a set of stereo cameras 372 and a scanning camera 374. The camera assembly 370 may be coupled to a boom assembly 360 that includes a first member 362 and a second member 364 to provide increased ranges of motion. The camera and boom assembly is described in more detail with respect to FIG. 6. The second cart 340 may include one or more overhead cameras and/or sensors.

The portable robotic assembly 300 may include a display 376 configured to present one or more selectable options, where selection of an option causes a computer system or a controller to initiate a corresponding action or operational mode at the portable robotic assembly 300. The display 376 may include an emergency stop button.

In some embodiments, the portable robotic assembly 300 may include a dedicated emergency stop button 378. The portable robotic assembly 300 may include any number of safety lights 352 and/or buzzer indicators to indicate operational modes to users. The portable robotic assembly 300 may include one or more laser safety scanners 334 to detect objects, humans, and/or obstacles. The portable robotic assembly 300 may include controls 336 for operation of the portable robotic assembly 300. As illustrated in detail view 344, the portable robotic assembly 300 may include a power inlet for lockout/tag out and air inlet for positive/negative air pressure generation (e.g., suction for a picking tool, etc.), operation of the pneumatic supports, and/or other functionality.

The portable robotic assembly 300 may include one or more computer systems or controllers configured to control operation of the first robotic arm and the camera assembly. For example, a user may select a selectable option that causes the controller to initiate corresponding actions, such as one or more of: item picking, item sorting, item induction, and truck loading. The controller may be configured to: determine that the item sorting selectable option was selected, cause the boom to position the camera assembly to image a group of items, determine a first item of the group of items, and cause the first robotic arm to grasp the first item and move the first item from a first location to a second location.

The sensors may be on a fixed boom with moveable positioning elements. The boom allows the robotic arm unimpeded motion while positioning the sensors to optimally support the performance needs of the system. The fixed boom includes mounting points for multiple sensor positioning arms, to increase the diversity of potential applications.

As illustrated in FIG. 3A, mechanical isolation of the robotic arm 320 from the sensors and camera function enable more accurate movement. The physical separation of the two functions eliminates the need to mitigate vibrational energy coupling between the accelerated movements of the arm and the sensors. Vibrating sensors may be less accurate at measuring the instantaneous environment. The system halves, sensing and manipulation, can be quickly coupled together for easy movement from location to location. The removable pin 380 can be inserted to lock the two halves together for movement. The linked, two section system is self-contained and may operate on standard wall power and compressed air to operate all station subsystems. The integrated rails enable the system to be lifted together and moved easily as a unit with either a pallet truck, forklift or other forked logistics system, and the station dimensions fit through a standard single door for maximum mobility.

Figure 3B:
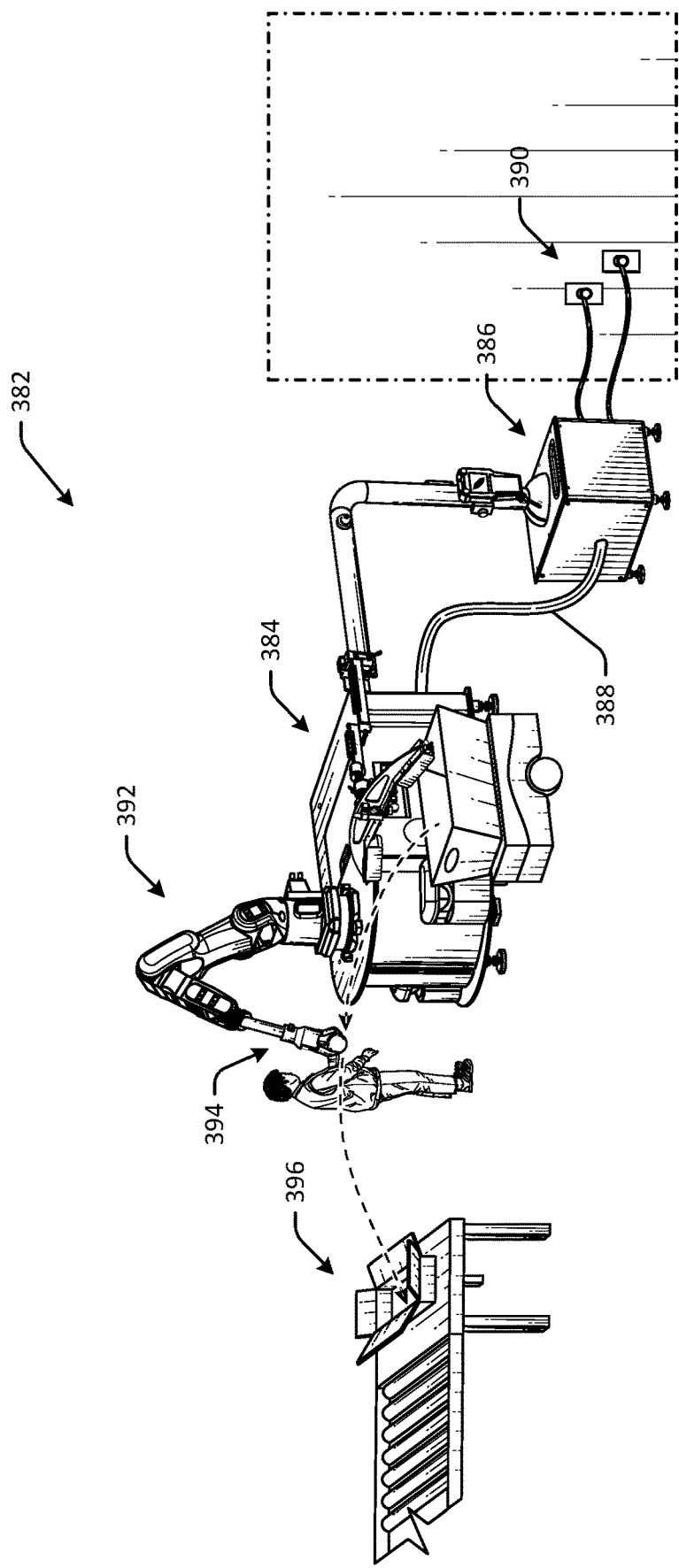
FIG. 3B is a schematic illustration of an example use case of a portable robotic manipulation assembly in perspective view in accordance with one or more embodiments of the disclosure.

FIG. 3B is a schematic illustration of an example use case 382 of a portable robotic manipulation assembly in perspective view in accordance with one or more embodiments of the disclosure. Other embodiments may include additional or fewer components. The illustration of FIG. 3B is not to scale, and may not be illustrated to scale with respect to other figures. The portable robotic manipulation assembly illustrated in FIG. 3B may be the same portable robotic manipulation assembly discussed with respect to FIGS. 1-3A.

In FIG. 3B, a portable robotic manipulation assembly may be working in tandem with a human to complete a task. The portable robotic manipulation assembly may be separated into two portions, and may remain physically connected via connection 388. The connection 388 may include electrical or other connections (e.g., air, etc.) to facilitate communication between the respective portions of the portable robotic manipulation assembly. A first portion 386 of the portable robotic manipulation assembly may be coupled to a wall outlet 390 for power, air, internet, etc. connections. The first portion 386 may include a sensor assembly, such as one or more cameras. Any number or type of sensors can be included.

A second portion 384 of the portable robotic manipulation assembly may be coupled to the first portion 386 via the connection 388 and may include one or more robotic arms 392. The robotic arm 392 may include any suitable attachment to perform a task. For example, in FIG. 3B, the robotic arm 392 may include a claw-like attachment 394 to pick up items from a tote and hand the item to a human. The human may then place the item into a box 396 for a collaborative packing assist function of the portable robotic manipulation assembly. The robotic arm 392 may release the item when a force or torque is detected, which may indicate the human has grasped the item. The first portion 386 and the second portion 384 may therefore work separately but in tandem to perform any suitable task, such as object identification, object grabbing, and so forth.

Figure 4:
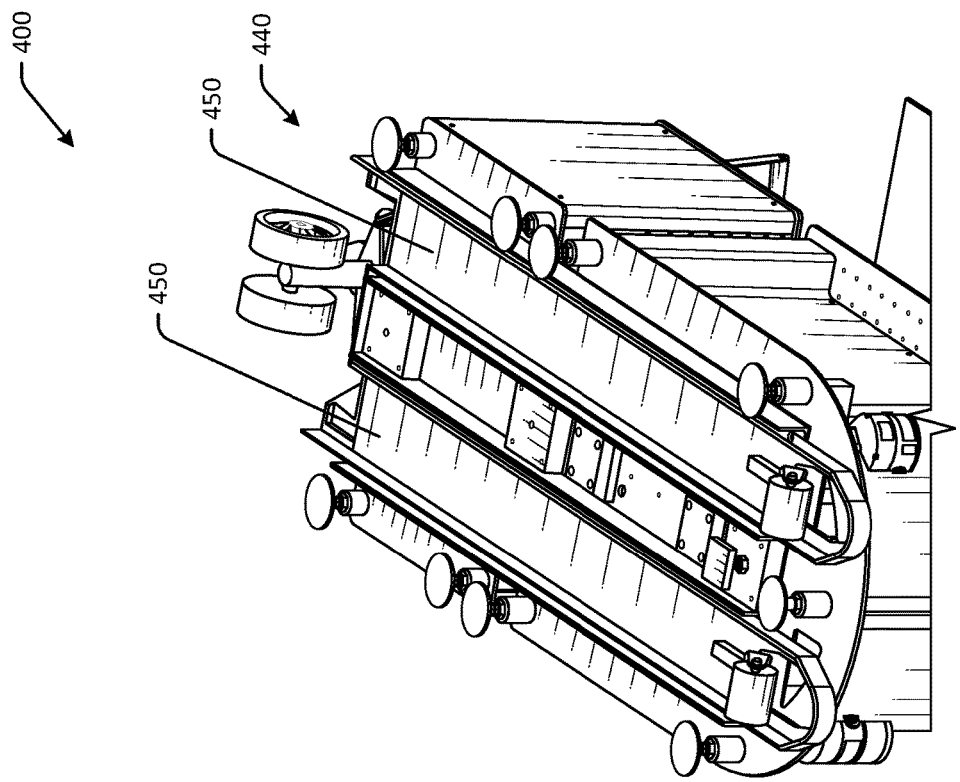
FIG. 4 is a schematic illustration of a bottom perspective view of a portable robotic manipulation assembly in accordance with one or more embodiments of the disclosure.
Figure 4:
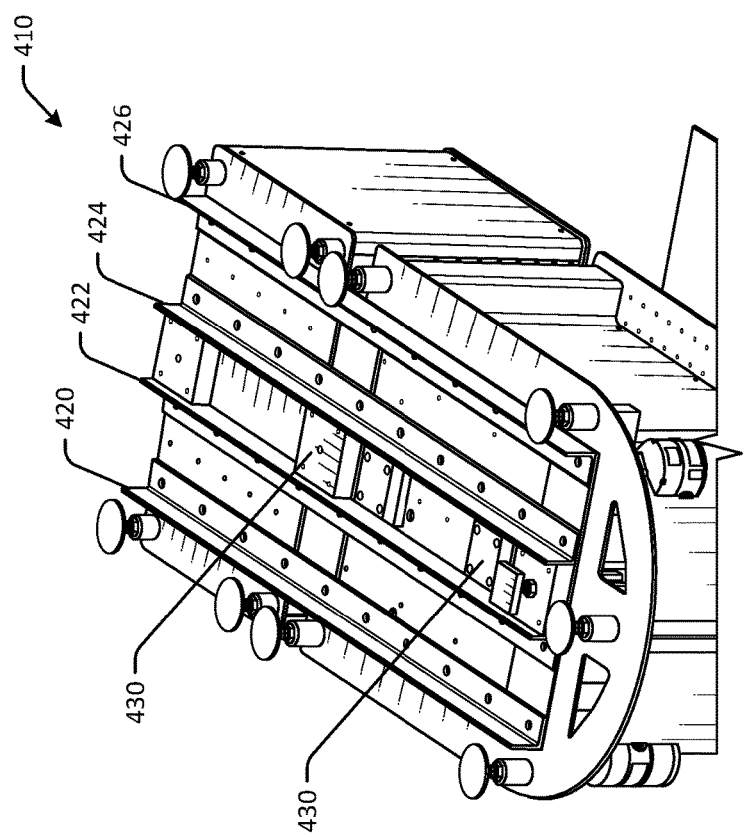

FIG. 4 is a schematic illustration of a bottom perspective view of a portable robotic manipulation assembly 400 in accordance with one or more embodiments of the disclosure. Other embodiments may include additional or fewer components. The illustration of FIG. 4 is not to scale, and may not be illustrated to scale with respect to other figures. The portable robotic manipulation assembly illustrated in FIG. 4 may be the same portable robotic manipulation assembly discussed with respect to FIGS. 1-3.

At a first instance 410, the portable robotic manipulation assembly 400 is depicted in bottom perspective view without a pallet truck inserted under the portable robotic manipulation assembly 400. The portable robotic manipulation assembly 400 may include one or more alignment components disposed on lower surfaces of the portable robotic manipulation assembly 400. The alignment components may be used to guide forklifts, pallet trucks, or other devices under the portable robotic manipulation assembly 400 for lift and/or transport. For example, the portable robotic manipulation assembly 400 may include a set of open-ended rails disposed on a lower surface of the robot assembly. The set of rails may be configured to engage a pallet jack or forklift for transport of the robot assembly. The set of rails may include a first rail 420 and a second rail 422 that form a first channel. The set of rails may include a third rail 424 and a fourth rail 426 that form a second channel. Forks of the pallet truck or forklift may slide into and out of the respective first channel and second channel from either side. Because the set of rails may be open-ended, the forklift can enter from either side of the portable robotic manipulation assembly 400. The portable robotic manipulation assembly 400 may include one or more alignment blocks 430 that can be used to ensure both carts of the portable robotic manipulation assembly 400 stay within a width of the pallet truck. As illustrated at a second instance 440, forks of the pallet truck 450 may slide into the set of rails and may be used to elevate and transport the portable robotic manipulation assembly 400. Although discussed in terms of pallet trucks and fork lifts, any autonomous or semi-autonomous vehicle can be used to move the portable robotic manipulation assembly 400. For example, small autonomous robots can engage either or both sides of the portable robotic manipulation assembly 400 to lift and move the portable robotic manipulation assembly 400.

Figure 5:
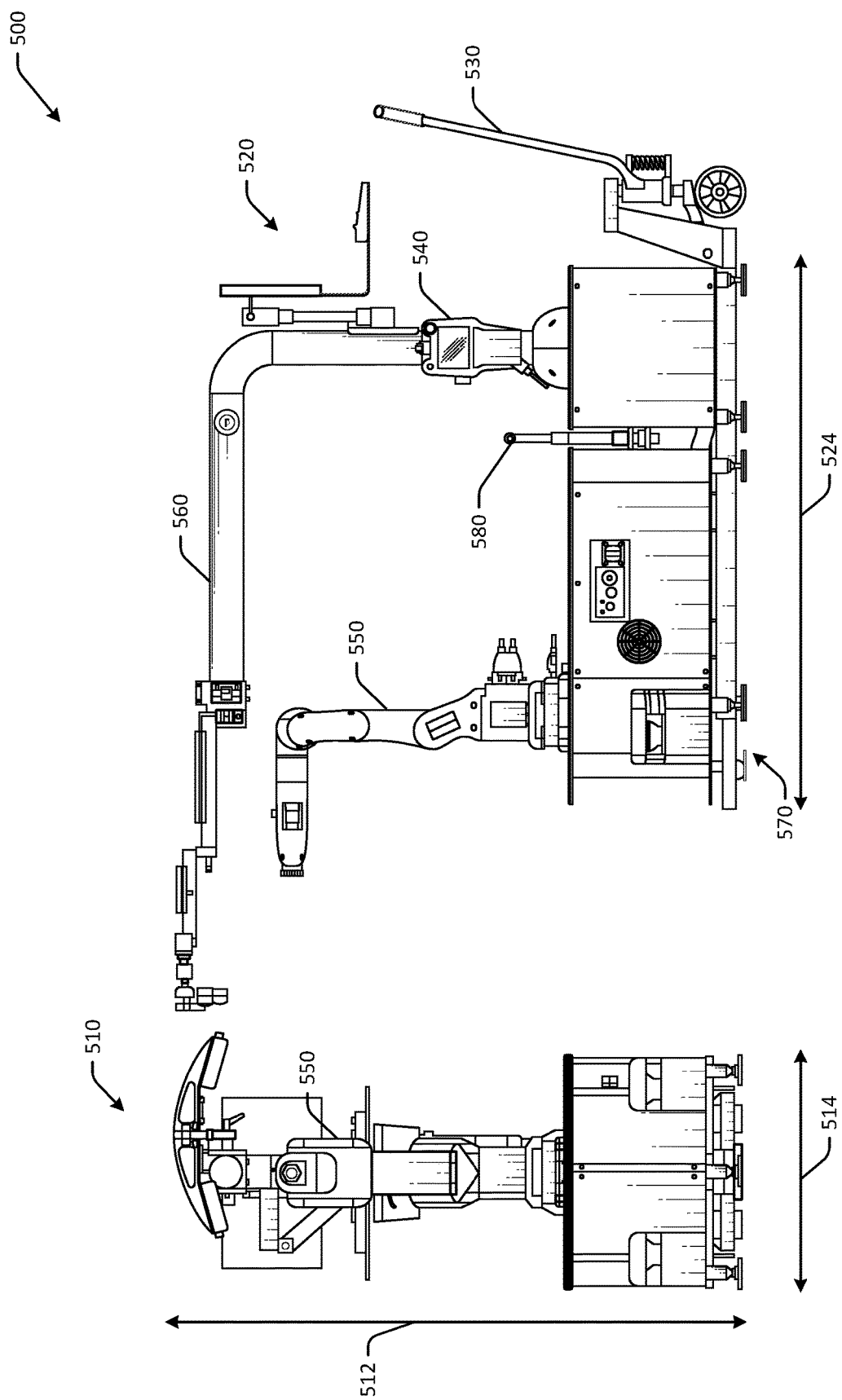
FIG. 5 is a schematic illustration of a portable robotic manipulation assembly loaded on a pallet truck in accordance with one or more embodiments of the disclosure.

FIG. 5 is a schematic illustration of a portable robotic manipulation assembly 500 loaded on a pallet truck in accordance with one or more embodiments of the disclosure. Other embodiments may include additional or fewer components. The illustration of FIG. 5 is not to scale, and may not be illustrated to scale with respect to other figures. The portable robotic manipulation assembly illustrated in FIG. 5 may be the same portable robotic manipulation assembly discussed with respect to FIGS. 1-4.

The portable robotic manipulation assembly 500 may be a robot assembly that includes a first portion and a second portion coupled to the first portion. The first portion may include a first robotic arm 550 configured to grasp objects. The second portion may include a moveable camera assembly 560. The portable robotic manipulation assembly 500 may include a controller configured to control operation of the first robotic arm 550 and operation of one or more cameras of the moveable camera assembly 560. In some embodiments, the portable robotic manipulation assembly 500 may include a touch display 540, control panel 520, and/or other device for input and/or control of the portable robotic manipulation assembly 500. The portable robotic manipulation assembly 500 may include a set of adjustable supports 570 configured to support the first portion and the second portion.

The portable robotic manipulation assembly 500 may be portable and configured to operate in fenced or unfenced environments. The portable robotic manipulation assembly 500 may be configured to perform different tasks in different environments. As illustrated in FIG. 5, the portable robotic manipulation assembly 500 is not coupled to a floor or a permanent support. The portable robotic manipulation assembly 500 may be configured to operate using 120 volt power or other wall outlet power, which may further enhance portability as there may not be special power requirements or hardware.

The portable robotic manipulation assembly 500 may have a height 512 of about 76 inches (and about 78 inches after being lifted by a pallet truck during transport). The portable robotic manipulation assembly 500 may have a width 514 of about 31 inches. The portable robotic manipulation assembly 500 may have a length 524 of about 72 inches.

As depicted in FIG. 5 in a side view and front view 510, the portable robotic manipulation assembly 500 may be moved using a pallet truck 530 (or a forklift, etc.). The pallet truck 530 may be inserted from either side of the portable robotic manipulation assembly 500 and may slide underneath the portable robotic manipulation assembly 500 while the portable robotic manipulation assembly 500 is on the floor. The pallet truck 530 may be used to lift or elevate the portable robotic manipulation assembly 500 by about 2 inches, after which the portable robotic manipulation assembly 500 may be transported. During transport, the first cart and the second cart of the portable robotic manipulation assembly 500 may be coupled using a removable pin 580. The first cart and the second cart may be optionally decoupled after transport.

The first robotic arm 550 may include a force-torque cell attached at an end of the first robotic arm 550, adjacent to the end of arm tool (e.g., picking tool, suction tool, imaging tool, etc.). The force-torque cell may be used for task alteration on the fly, as well as direct collaboration with humans. For example, force can be used to understand how heavy an item is when it is grasped. Knowing the mass can be used to determine how quickly to accelerate the arm to translate the object. Heavy objects accelerated too quickly can be lost to the grasp. Items that are off center can also be lost to the grasp, but the force-torque cell can be used to estimate the amount of cantilever and adjust the angle to minimize the applied torque and the likelihood of losing grasp of the object. Torque and force can also be used to sense when a human is interacting with the arm. For instance, if the robot arm presents an object to the human, the arm can sense when the human has grasped the gift and can release the object and begin the next task. The portable robotic manipulation assembly 500 may therefore be a robotic picking system that includes the first robotic arm 550 configured to grasp objects, a moveable camera assembly 560, one or more torque or force sensors, and a controller configured to control operation of the first robotic arm 550 and moveable camera assembly 560.

Figure 6:
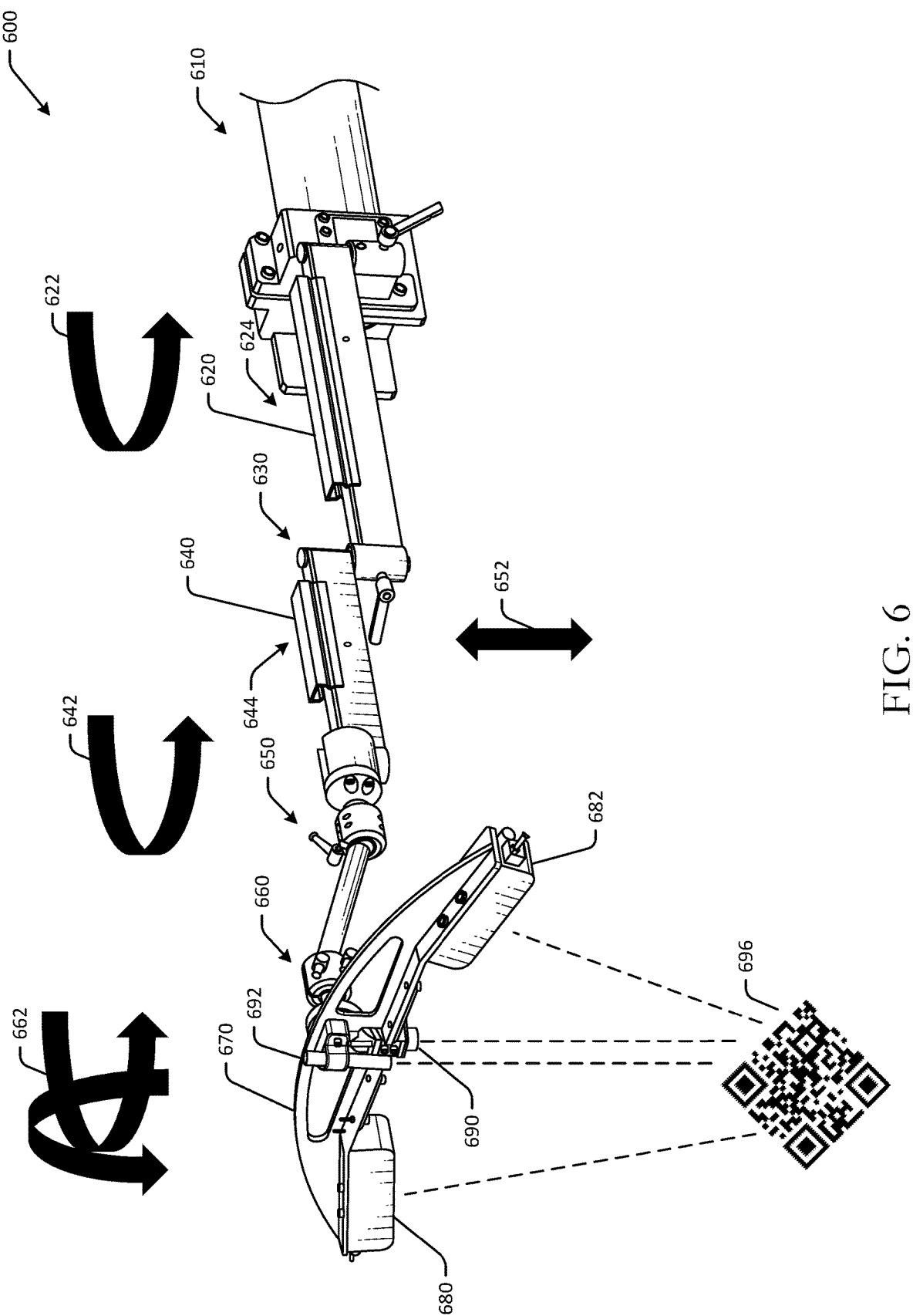
FIG. 6 is a schematic illustration of an example moveable camera assembly in accordance with one or more embodiments of the disclosure.

FIG. 6 is a schematic illustration of an example moveable camera assembly 600 in accordance with one or more embodiments of the disclosure. Other embodiments may include additional or fewer components. The illustration of FIG. 6 is not to scale, and may not be illustrated to scale with respect to other figures. The moveable camera assembly illustrated in FIG. 6 may be used with the same portable robotic manipulation systems discussed with respect to FIGS. 1-5.

In some embodiments, the moveable camera assembly 600 may be coupled to a robotic arm, while in other embodiments such as that illustrated in FIG. 6, the moveable camera assembly 600 may be coupled to a boom assembly. The boom assembly may be motorized for automated motion or may be movable manually. The boom assembly may have six degrees of freedom. For example, the boom assembly may be able to rotate with respect to a portable robotic manipulation assembly, and may include components configured to allow cameras to translate back and forth, move up and down, move left and right, and rotate along yaw, pitch, and roll axes. In other embodiments, the moveable camera assembly 600 may have a reduced number of degrees of freedom.

The moveable camera assembly 600 may be coupled to a bent arm 610 that is coupled to a second cart of a portable robotic manipulation assembly. The moveable camera assembly 600 may include a first member 620 coupled to the bent arm 610. The bent arm 610 may be fixed relative to the second cart in some embodiments, and may rotate with respect to the second cart in other embodiments. The joint between the first member 620 and the bent arm 610 may be positioned over or near a center of the portable robotic manipulation assembly, so as to increase stability and provide improved center of mass positioning. The first member 620 may be rotatable in direction 622 (and its opposite direction) with respect to the joint between the first member 620 and the bent arm 610. The first member 620 may have one or more lockable positions 624 along a length of the first member 620 (e.g., along an x/y axis).

A second member 640 may be coupled to the first member 620 at a joint 630. The second member 640 may be rotatable about the joint 630 in direction 642 (and its opposite direction). The second member 640 may have one or more lockable positions 644 along a length of the second member 640 (e.g., along an x/y axis).

A third member 650 may be coupled to an end of the second member 640. The third member 650 may provide movement in an up and down range, or in a z-axis direction 652. In some embodiments, the third member 650 may include a ball-and-socket joint or other coupling mechanism, such as a locking wrist, that provides range of motion at least along the z-axis (and/or in more directions), and can be locked into a desired position, such as with a pin that can be tightened. The third member 650 may include a first ball-and-socket joint at a connection to the second member 640, and a second ball-and-socket joint at a connection to a camera assembly 660. For example, the third member 650 may include another ball-and-socket joint at a connection to the camera assembly 660. The camera assembly 660 may therefore be moveable along directions 662 (and the opposite directions). For example, the camera assembly 660 may be rotatable in any direction with respect to the third member 650.

The camera assembly 660 may include a bracket 670 with one or more cameras mounted thereon. For example, the camera assembly 660 may include a first camera 680 disposed on a first side of the bracket 670 and disposed at a first angle, and may include a second camera 682 disposed on a second side of the bracket 670 and disposed at a second angle. The first angle may be the opposite of the second angle. The first camera 680 and the second camera 682 may be the same type of camera or different camera types. For example, the first camera 680 and the second camera 682 may both be stereo vision cameras or three-dimensional cameras. Orientations of the first camera 680 and the second camera 682 may be fixed, or may be individually adjustable. The camera assembly 660 may include a third camera 690 disposed along a middle portion of the bracket 670. The third camera 690 may be disposed between the first camera 680 and the second camera 682. The third camera 690 may be the same type of camera as the first camera 680 and/or the second camera 682, or a different camera type. For example, the third camera 690 may be an area scanning camera, a line scanning camera, a network camera, a three-dimensional camera, or another camera type. The first camera 680, the second camera 682, and third camera 690 may be used to for instance segmentation and/or grasp point generation during use of the portable robotic manipulation assembly.

The camera assembly 660 may include a laser pointer 692 that can be used to manually or automatically aim the respective fields of view 694 of the first camera 680, the second camera 682, and third camera 690. For example, when the portable robotic manipulation assembly is moved from one location or another, the laser pointer 692 may be used to set a position of the moveable camera assembly 600. In some embodiments, the laser pointer 692 may be used to direct the moveable camera assembly 600 to a fiducial or other machine readable code 696 to set a task or operational mode of the portable robotic manipulation assembly. Other embodiments may use any suitable marker of any type instead of, or in addition to, a machine readable code, including magnetic indicators, light-based indicators, or other physical indicators. The machine readable code 696 may be used by the portable robotic manipulation assembly to determine which tasks to be performed, for calibration, to determine which operational mode to initiate, to determine a location of the portable robotic manipulation assembly, and the like. Unique fiducials, indicators, or machine readable codes can be used by the portable robotic manipulation assembly to identify work spaces, and to enable the system to automatically shift to the mode appropriate for a current work space, such as during a move from a pick station to a pack station.

The moveable camera assembly 600 may therefore create separation between the camera assembly 660 so as to isolate vibration from the robotic arm of the portable robotic manipulation assembly, thereby enabling rapid calibration of the work space each time the system is moved for redeployment in a new context. For example, a controller of the portable robotic manipulation assembly may be configured to cause the camera assembly 660 to automatically capture an image of the machine readable code 696. The machine readable code 696 may cause the controller to initiate an action or operational mode at the portable robotic manipulation assembly. For example, if the operational mode is a picking mode, the controller may be configured to cause the first robotic arm to move a first object, and to cause the moveable camera assembly 600 to capture an image of a second object to be moved while the first object is being moved.

The controller may therefore be configured to determine a location of the robotic picking system (e.g., using the machine readable code 696 or otherwise), determine a task corresponding to the location and cause the robotic picking system to implement the task. The robot assembly is portable and configured to operate in fenced or unfenced environments, and may be configured to perform different tasks in different environments.

Figure 7:
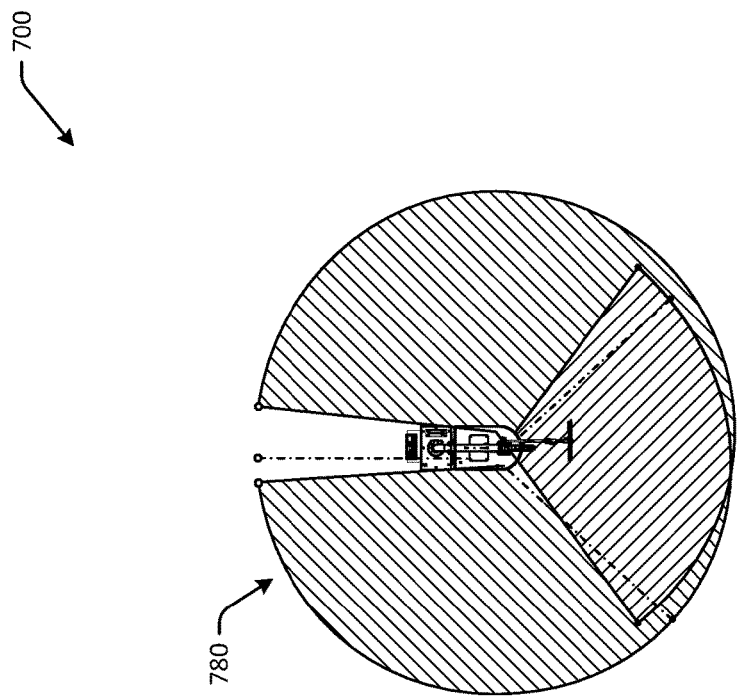
FIG. 7 is a schematic illustration of example ranges of motion in accordance with one or more embodiments of the disclosure.
Figure 7:
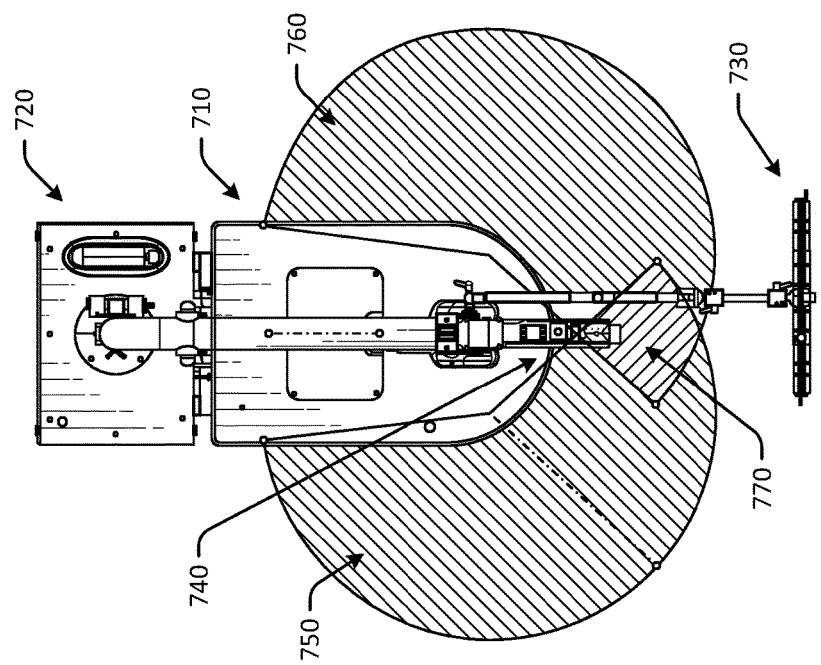

FIG. 7 is a schematic illustration of example ranges of motion 700 in accordance with one or more embodiments of the disclosure. Other embodiments may include additional or fewer components. The illustration of FIG. 7 is not to scale, and may not be illustrated to scale with respect to other figures. The ranges of motion illustrated in FIG. 7 may be applicable to any one of the portable robotic manipulation systems discussed with respect to FIGS. 1-6.

In FIG. 7, a portable robotic manipulation assembly is illustrated in a top view. The portable robotic manipulation assembly may include a first portion 710 and a second portion 720. The first portion 710 may be a first cart and the second portion 720 may be a second cart. The first portion 710 and the second portion 720 may be coupled together. A robotic arm 740 may be coupled to the first portion 710. A moveable camera assembly 730 may be coupled to the second portion 720. In some instances, the moveable camera assembly 730 may be coupled to a robotic arm, while in other instances, the moveable camera assembly 730 may be coupled to a boom or may be mounted in a fixed position.

The moveable camera assembly 730 may be moveable with respect to the second portion 720. For example, the moveable camera assembly 730 may be coupled to a bent arm that is rotatable with respect to an upper surface of the second portion 720. Accordingly, as a result of the respective camera fields of view and/or the ability to move, the moveable camera assembly 730 may have unobstructed views along one or more, or all, sides of the first portion 710. For example, the moveable camera assembly 730 may be moveable such that the cameras of the moveable camera assembly 730 can image a 275 degree radius 770 about the first portion 710. The moveable camera assembly 730 may be configured to move into positions to view a first side 750 of the first portion 710 and a second side 760 of the first portion 710. As the moveable camera assembly 730 is moved, the moveable camera assembly 730 may image the surroundings of the portable robotic manipulation assembly so as to identify hazards, detect objects, locate items, and so forth. The moveable camera assembly 730 may image a "front" area of the first portion 710 in between the first side 750 and the second side 760 in any position, as illustrated by the overlap in the fields of view in FIG. 7 ("front" is used as a relative term for illustrative purposes only, and is not an absolute position). In a separate top view illustration 780, the entire field of view covered by the moveable camera assembly 730 is depicted, illustrating the amount of space that can be imaged for various purposes by the moveable camera assembly 730.

Figure 8:
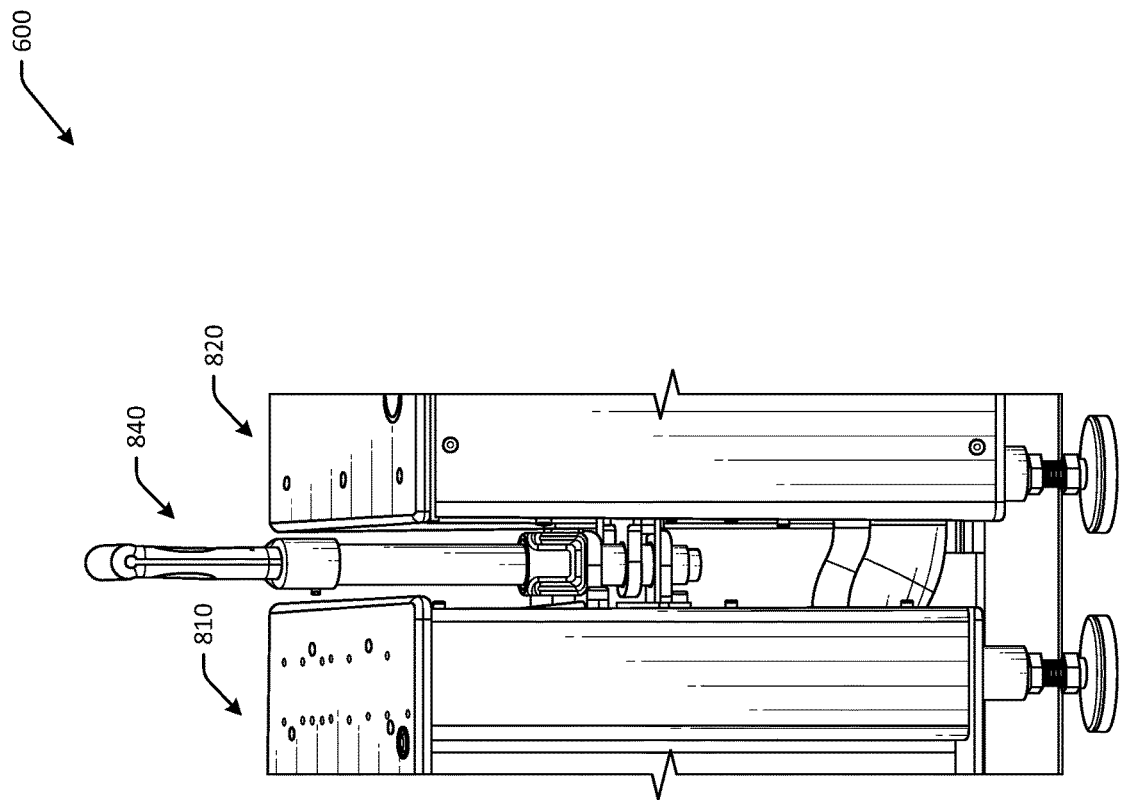
FIG. 8 is a schematic illustration of an example removable pin in accordance with one or more embodiments of the disclosure.
Figure 8:
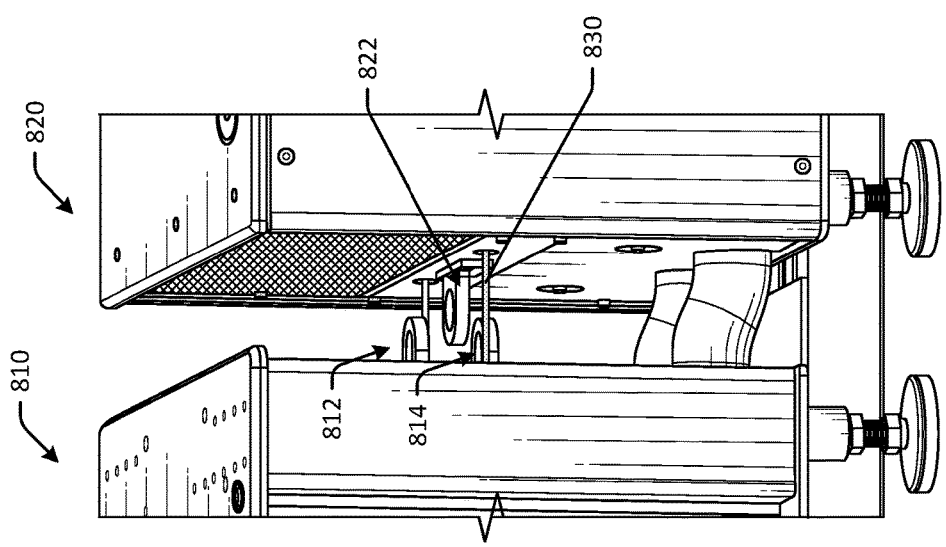

FIG. 8 is a schematic illustration of an example removable pin in accordance with one or more embodiments of the disclosure. Other embodiments may include additional or fewer components. The illustration of FIG. 8 is not to scale, and may not be illustrated to scale with respect to other figures. The removable pin illustrated in FIG. 8 may be used with any one of the portable robotic manipulation systems discussed with respect to FIGS. 1-7.

In an embodiment of a portable robotic manipulation assembly 800, the portable robotic manipulation assembly 800 may include one or more removable pins 840 that are configured to couple and/or decouple a first cart 810 and a second cart 820 of the portable robotic manipulation assembly 800. The removable pin 840 may be a handle, pin, lever, coupling device, or other locking mechanism and may be configured to pull the first cart 810 towards the second cart 820, pull the second cart 820 towards the first cart 810, and/or pull the first cart 810 and the second cart 820 towards each other. The removable pin 840 may include a handle portion for manual manipulation of the removable pin 840. The removable pin 840 may be configured to secure or otherwise couple the first cart 810 and the second cart 820 together. When used with the portable robotic manipulation assembly 800, the removable pin 840 may increase a structural rigidity of the portable robotic manipulation assembly 800. Such rigidity may be helpful during transport of the portable robotic manipulation assembly 800.

To secure the first cart 810 and the second cart 820, the removable pin 840 may be inserted through openings or apertures formed in sidewalls and/or brackets coupled to sidewalls of the respective first cart 810 and the second cart 820. For example, a first bracket 812 with a first aperture and a second bracket 814 with a second aperture may be coupled to a sidewall of the first cart 810. A third bracket 822 with a third aperture may be coupled to a sidewall of the second cart 820. The removable pin 840 may be inserted through the respective apertures in the first bracket 812, second bracket 814, and third bracket 822 to couple the first cart 810 and the second cart 820. The third bracket 822 may be disposed in between the first bracket 812 and the second bracket 814 in a vertical alignment. When the removable pin 840 is inserted, the respective apertures may be vertically aligned. The removable pin 840 may prevent horizontal separation of the first cart 810 and the second cart 820.

When the removable pin 840 is removed from the respective openings in the first bracket 812, second bracket 814, and third bracket 822, the first cart 810 may be decoupled from the second cart 820. For example, the first cart 810 may be moveable with respect to the second cart 820. In some embodiments, one or more optional cables 830 may be used to limit a distance that the first cart 810 and second cart 820 can be separated. For example, a flexible steel cable 830 may be used to couple the first cart 810, or the first portion of the portable robotic manipulation assembly 800, to the second cart 820, or the second portion portable robotic manipulation assembly 800. To insert the removable pin 840, the first cart 810 and second cart 820 may be automatically or manually pushed together such that the respective brackets are aligned, and the removable pin 840 may be inserted. The removable pin 840 may therefore be configured to engage an opening in the first bracket 812 coupled to a first sidewall of the first portion or first cart 810, and an opening in a second bracket coupled to a second sidewall of the second portion or second cart 820. The first cart and the second cart may be pulled closer to each other when the removable pin engages the respective openings in the first bracket and the second bracket.

One or more operations of the methods, process flows, or use cases of FIGS. 1-8 may have been described above as being performed by a user device, or more specifically, by one or more program module(s), applications, or the like executing on a device. It should be appreciated, however, that any of the operations of the methods, process flows, or use cases of FIGS. 1-8 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-8 may be described in the context of the illustrative devices, it should be appreciated that such operations may be implemented in connection with numerous other device configurations.

The operations described and depicted in the illustrative methods, process flows, and use cases of FIGS. 1-8 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 9:
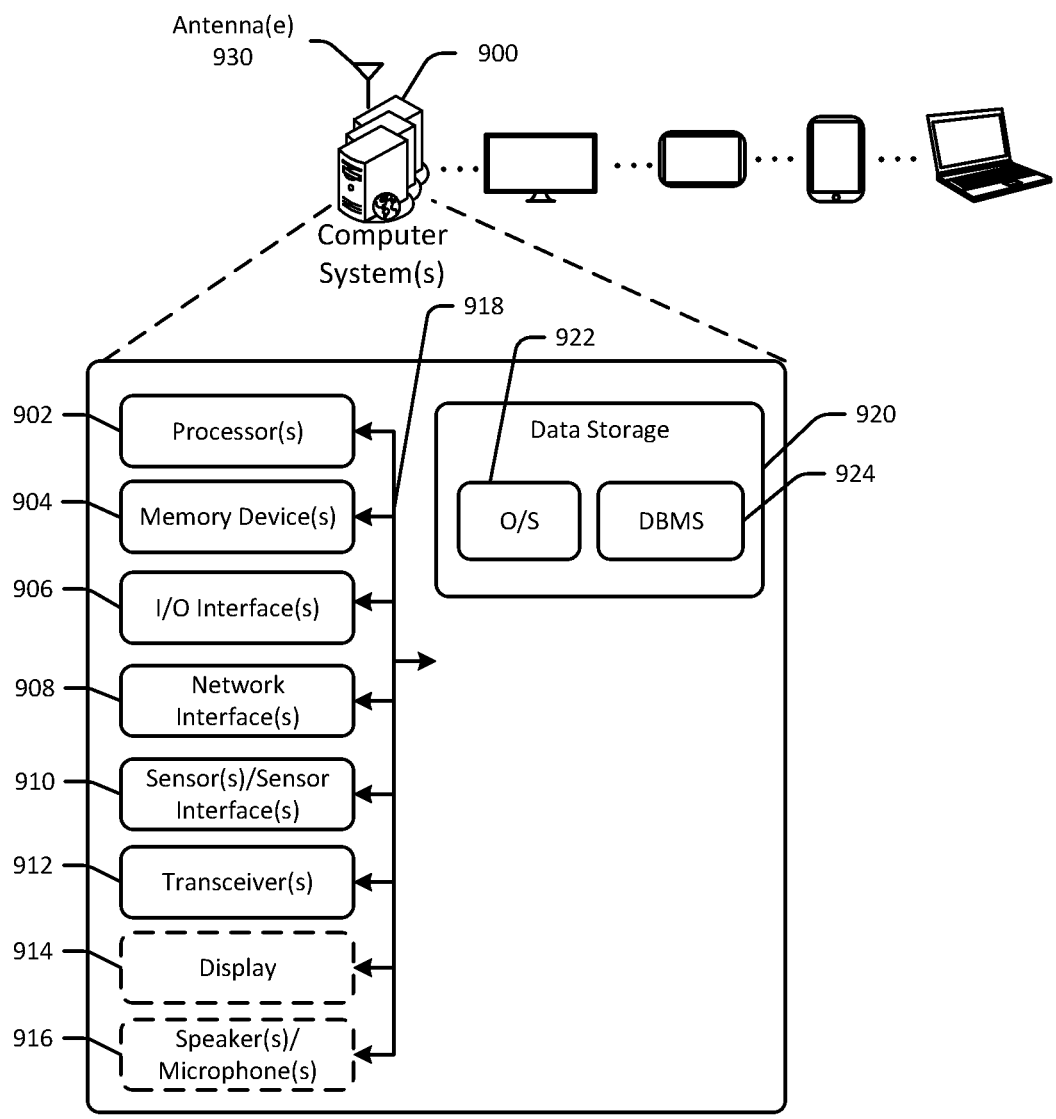
FIG. 9 schematically illustrates an example architecture of a computer system associated with a portable robotic manipulation assembly in accordance with one or more embodiments of the disclosure.

FIG. 9 is a schematic block diagram of one or more illustrative controller(s) or computer system(s) 900 in accordance with one or more example embodiments of the disclosure. The computer system(s) 900 may include any suitable computing device including, but not limited to, a server system, a voice interaction device, a mobile device such as a smartphone, a tablet, an e-reader, a wearable device, or the like; a desktop computer; a laptop computer; or the like. The computer system(s) 900 may correspond to an illustrative controller configuration for the device(s) of FIGS. 1-8. For example, the computer system(s) 900 may control one or more aspects of the portable robotic manipulation systems described in FIGS. 1-8.

The computer system(s) 900 may be configured to communicate with one or more servers, user devices, or the like. The computer system(s) 900 may be configured to identify items, retrieve items, move items, and so forth.

The computer system(s) 900 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 900 may include one or more processors (processor(s)) 902, one or more memory devices 904 (also referred to herein as memory 904), one or more input/output (I/O) interface(s) 906, one or more network interface(s) 908, one or more sensor(s) or sensor interface(s) 910, one or more transceiver(s) 912, one or more optional display(s) 914, one or more optional microphone(s) 916, and data storage 920. The computer system(s) 900 may further include one or more bus(es) 918 that functionally couple various components of the computer system(s) 900. The computer system(s) 900 may further include one or more antenna(e) 930 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 918 may include at least one of a system bus, a memory bus, an address bus, or a message bus, and may permit the exchange of information (e.g., data (including computer-executable code), signaling, etc.) between various components of the computer system(s) 900. The bus(es) 918 may include, without limitation, a memory bus or a memory controller, a peripheral bus, an accelerated graphics port, and so forth. The bus(es) 918 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 904 of the computer system(s) 900 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 904 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 920 may include removable storage and/or non-removable storage including, but not limited to, magnetic storage, optical disk storage, and/or tape storage. The data storage 920 may provide non-volatile storage of computer-executable instructions and other data. The memory 904 and the data storage 920, removable and/or non-removable, are examples of computer-readable storage media (CRSM) as that term is used herein.

The data storage 920 may store computer-executable code, instructions, or the like that may be loadable into the memory 904 and executable by the processor(s) 902 to cause the processor(s) 902 to perform or initiate various operations. The data storage 920 may additionally store data that may be copied to the memory 904 for use by the processor(s) 902 during the execution of the computer-executable instructions. Moreover, output data generated as a result of execution of the computer-executable instructions by the processor(s) 902 may be stored initially in the memory 904, and may ultimately be copied to the data storage 920 for non-volatile storage.

More specifically, the data storage 920 may store one or more operating systems (O/S) 922; one or more database management systems (DBMS) 924; and one or more program module(s), applications, engines, computer-executable code, scripts, or the like. Some or all of these module(s) may be sub-module(s). Any of the components depicted as being stored in the data storage 920 may include any combination of software, firmware, and/or hardware. The software and/or firmware may include computer-executable code, instructions, or the like that may be loaded into the memory 904 for execution by one or more of the processor(s) 902. Any of the components depicted as being stored in the data storage 920 may support functionality described in reference to corresponding components named earlier in this disclosure.

The data storage 920 may further store various types of data utilized by the components of the computer system(s) 900. Any data stored in the data storage 920 may be loaded into the memory 904 for use by the processor(s) 902 in executing computer-executable code. In addition, any data depicted as being stored in the data storage 920 may potentially be stored in one or more datastore(s) and may be accessed via the DBMS 924 and loaded in the memory 904 for use by the processor(s) 902 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 902 may be configured to access the memory 904 and execute the computer-executable instructions loaded therein. For example, the processor(s) 902 may be configured to execute the computer-executable instructions of the various program module(s), applications, engines, or the like of the computer system(s) 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to other illustrative components depicted as being stored in the data storage 920, the O/S 922 may be loaded from the data storage 920 into the memory 904 and may provide an interface between other application software executing on the computer system(s) 900 and the hardware resources of the computer system(s) 900. More specifically, the O/S 922 may include a set of computer-executable instructions for managing the hardware resources of the computer system(s) 900 and for providing common services to other application programs (e.g., managing memory allocation among various application programs). In certain example embodiments, the O/S 922 may control execution of the other program module(s). The O/S 922 may include any operating system now known or which may be developed in the future including, but not limited to, any server operating system, any mainframe operating system, or any other proprietary or non-proprietary operating system.

The DBMS 924 may be loaded into the memory 904 and may support functionality for accessing, retrieving, storing, and/or manipulating data stored in the memory 904 and/or data stored in the data storage 920. The DBMS 924 may use any of a variety of database models (e.g., relational model, object model, etc.) and may support any of a variety of query languages. The DBMS 924 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 900 is a mobile device, the DBMS 924 may be any suitable lightweight DBMS optimized for performance on a mobile device.

Referring now to other illustrative components of the computer system(s) 900, the input/output (I/O) interface(s) 906 may facilitate the receipt of input information by the computer system(s) 900 from one or more I/O devices as well as the output of information from the computer system(s) 900 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 900 or may be separate. The I/O devices may further include, for example, any number of peripheral devices such as data storage devices, printing devices, and so forth.

The I/O interface(s) 906 may also include an interface for an external peripheral device connection such as universal serial bus (USB), FireWire, Thunderbolt, Ethernet port or other connection protocol that may connect to one or more networks. The I/O interface(s) 906 may also include a connection to one or more of the antenna(e) 930 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 900 may further include one or more network interface(s) 908 via which the computer system(s) 900 may communicate with any of a variety of other systems, platforms, networks, devices, and so forth. The network interface(s) 908 may enable communication, for example, with one or more wireless routers, one or more host servers, one or more web servers, and the like via one or more networks.

The antenna(e) 930 may include any suitable type of antenna depending, for example, on the communications protocols used to transmit or receive signals via the antenna (e) 930. Non-limiting examples of suitable antennae may include directional antennae, non-directional antennae, dipole antennae, folded dipole antennae, patch antennae, multiple-input multiple-output (MIMO) antennae, or the like. The antenna(e) 930 may be communicatively coupled to one or more transceivers 912 or radio components to which or from which signals may be transmitted or received.

As previously described, the antenna(e) 930 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 930 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 930 may be configured to transmit or receive radio frequency signals within any suitable frequency range forming part of the unlicensed portion of the radio spectrum.

The antenna(e) 930 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 912 may include any suitable radio component(s) for—in cooperation with the antenna(e) 930— transmitting or receiving radio frequency (RF) signals in the bandwidth and/or channels corresponding to the communications protocols utilized by the computer system(s) 900 to communicate with other devices. The transceiver(s) 912 may include hardware, software, and/or firmware for modulating, transmitting, or receiving—potentially in cooperation with any of antenna(e) 930—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 912 may further include hardware, firmware, or software for receiving GNSS signals. The transceiver(s) 912 may include any known receiver and baseband suitable for communicating via the communications protocols utilized by the computer system(s) 900. The transceiver(s) 912 may further include a low noise amplifier (LNA), additional signal amplifiers, an analog-to-digital (A/D) converter, one or more buffers, a digital baseband, or the like.

The sensor(s)/sensor interface(s) 910 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 914 may be configured to output light and/or render content. The optional speaker(s)/microphone(s) 916 may be any device configured to receive analog sound input or voice data.

It should be appreciated that the program module(s), applications, computer-executable instructions, code, or the like depicted in FIG. 9 as being stored in the data storage 920 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 900, and/or hosted on other computing device(s) accessible via one or more networks, may be provided to support functionality provided by the program module(s), applications, or computer-executable code depicted in FIG. 9 and/or additional or alternate functionality. Further, functionality may be modularized differently such that processing described as being supported collectively by the collection of program module(s) depicted in FIG. 9 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 9 may be implemented, at least partially, in hardware and/or firmware across any number of devices.

It should further be appreciated that the computer system(s) 900 may include alternate and/or additional hardware, software, or firmware components beyond those described or depicted without departing from the scope of the disclosure. More particularly, it should be appreciated that software, firmware, or hardware components depicted as forming part of the computer system(s) 900 are merely illustrative and that some components may not be present or additional components may be provided in various embodiments. While various illustrative program module(s) have been depicted and described as software module(s) stored in the data storage 920, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-8 may be performed by a device having the illustrative configuration depicted in FIG. 9, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-8 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A robot assembly comprising:
a first cart comprising a first robotic arm configured to manipulate objects, the first cart comprising a first adjustable support configurable to support the first cart, and a first upper surface configured to move relative to sidewalls of the first cart;
a second cart coupleable to the first cart, the second cart comprising a moveable sensor assembly, the second cart comprising a second adjustable support configurable to support the second cart, and a second upper surface that is fixed relative to sidewalls of the second cart, wherein the first cart and the second cart are configured to be decoupled; and
a controller configured to control operation of the first robotic arm and operation of the moveable sensor assembly;
wherein the robot assembly is portable and configured to operate in fenced or unfenced environments, and wherein the robot assembly is configured to perform different tasks in different environments.

2. The robot assembly of claim 1, further comprising:
a set of open-ended rails disposed on a lower surface of the robot assembly, the set of rails configured to engage a device for transport of the robot assembly.

3. The robot assembly of claim 1, further comprising:
a set of pneumatic air supports coupled to the first upper surface of the first cart, the set of pneumatic air supports configured to dampen vibration of the first upper surface.

4. The robot assembly of claim 1, further comprising:
a local or remote display configured to present one or more selectable options, wherein selection of an option causes the controller to initiate a corresponding action or operational mode at the robot assembly.

5. The robot assembly of claim 1, wherein the controller is further configured to cause the moveable sensor assembly to automatically detect a machine readable indicator, wherein the machine readable indicator causes the controller to initiate an action or operational mode at the robot assembly.

6. The robot assembly of claim 1, wherein the controller is further configured to cause the first robotic arm to move a first object, and to cause the moveable sensor assembly to capture an image of a second object to be moved while the first object is being moved.

7. The robot assembly of claim 1, wherein the second cart further comprises:
a boom assembly having six degrees of freedom, wherein the moveable sensor assembly is coupled to the boom assembly, and wherein the moveable sensor assembly comprises a plurality of stereo vision cameras.

8. The robot assembly of claim 1, further comprising:
a virtual safe zone about the robot assembly, wherein the virtual safe zone is determine using one or more sensors of the robot assembly.

9. The robot assembly of claim 1, further comprising:
a removable pin configured to engage an opening in a first bracket coupled to a first sidewall of the first cart, and an opening in a second bracket coupled to a second sidewall of the second cart.

10. The robot assembly of claim 1, wherein the robot assembly is not coupled to a floor or a permanent support.

11. The robot assembly of claim 1, wherein the robot assembly is configured to operate using a wall outlet that provides current of about 20 amperes.

* * * * *